United States Patent
Collins et al.

(10) Patent No.: US 7,298,877 B1
(45) Date of Patent: Nov. 20, 2007

(54) INFORMATION FUSION WITH BAYES NETWORKS IN COMPUTER-AIDED DETECTION SYSTEMS

(75) Inventors: Michael J. Collins, Beavercreek, OH (US); Richard A. Mitchell, Springboro, OH (US); Steven W. Worrell, Beavercreek, OH (US)

(73) Assignee: ICad, Inc., Nashua, NH (US)

( * ) Notice: Subject to any disclaimer, the term of this patent is extended or adjusted under 35 U.S.C. 154(b) by 919 days.

(21) Appl. No.: 10/288,766

(22) Filed: Nov. 6, 2002

Related U.S. Application Data

(60) Provisional application No. 60/333,825, filed on Nov. 20, 2001.

(51) Int. Cl.
  *G06K 9/00* (2006.01)
  *G06K 9/62* (2006.01)
  *G06K 9/34* (2006.01)
  *G01N 23/00* (2006.01)
  *A61B 6/00* (2006.01)

(52) U.S. Cl. ............ 382/128; 382/155; 382/173; 382/181; 378/1; 378/4

(58) Field of Classification Search ............ 382/32, 382/155–160, 173, 180, 181, 190, 192, 195, 382/203, 206, 224, 225; 378/1, 4, 21, 62
See application file for complete search history.

(56) References Cited

U.S. PATENT DOCUMENTS

| | | | | |
|---|---|---|---|---|
| 5,260,871 A | * | 11/1993 | Goldberg | 382/128 |
| 5,627,907 A | * | 5/1997 | Gur et al. | 382/132 |
| 5,661,820 A | | 8/1997 | Kegelmeyer, Jr. | |
| 5,696,884 A | * | 12/1997 | Heckerman et al. | 706/61 |
| 5,704,018 A | * | 12/1997 | Heckerman et al. | 706/12 |
| 5,799,100 A | * | 8/1998 | Clarke et al. | 382/132 |
| 5,802,256 A | * | 9/1998 | Heckerman et al. | 706/59 |
| 5,815,591 A | * | 9/1998 | Roehrig et al. | 382/130 |
| 5,999,639 A | * | 12/1999 | Rogers et al. | 382/132 |
| 6,056,690 A | | 5/2000 | Roberts | |
| 6,075,879 A | * | 6/2000 | Roehrig et al. | 382/132 |
| 6,115,488 A | * | 9/2000 | Rogers et al. | 382/132 |
| 6,138,045 A | * | 10/2000 | Kupinski et al. | 600/425 |
| 6,198,838 B1 | * | 3/2001 | Roehrig et al. | 382/132 |
| 6,205,236 B1 | * | 3/2001 | Rogers et al. | 382/132 |
| 6,404,908 B1 | | 6/2002 | Schneider et al. | |
| 6,529,888 B1 | * | 3/2003 | Heckerman et al. | 706/45 |
| 6,601,055 B1 | * | 7/2003 | Roberts | 706/45 |
| 6,738,499 B1 | * | 5/2004 | Doi et al. | 382/128 |
| 6,801,645 B1 | * | 10/2004 | Collins et al. | 382/130 |

(Continued)

OTHER PUBLICATIONS

Heang-Ping Chan, et al., Computer-aided classification of mammographic masses and normal tissue: linear discriminant analysis in texture feature space; Phys. Med. Biol., 1995, pp. 857-876; vol. 40; IOP Publishing Ltd.; UK.

(Continued)

*Primary Examiner*—Bhavesh M Mehta
*Assistant Examiner*—Manav Seth
(74) *Attorney, Agent, or Firm*—Dinsmore & Shohl LLP

(57) ABSTRACT

This invention provides an information fusion method for multiple indicators of cancers detected with multiple channels. Each channel consists of specifically tuned detectors, features, classifiers and Bayes networks. The outputs of the Bayes networks are probabilities of malignancy for the detections passing the corresponding classifier.

20 Claims, 15 Drawing Sheets

U.S. PATENT DOCUMENTS

| | | | | |
|---|---|---|---|---|
| 6,810,391 | B1* | 10/2004 | Birkhoelzer et al. | 706/8 |
| 7,024,399 | B2* | 4/2006 | Sumner et al. | 706/45 |
| 2003/0104499 | A1* | 6/2003 | Pressman et al. | 435/7.23 |
| 2003/0190602 | A1* | 10/2003 | Pressman et al. | 435/5 |
| 2003/0199685 | A1* | 10/2003 | Pressman et al. | 536/24.3 |
| 2006/0171573 | A1* | 8/2006 | Rogers | 382/128 |

OTHER PUBLICATIONS

Yuan-Hsiang Chang et al., Robustness of Computerized Identification of Masses in Digitized Mammograms; Investigative Radiology; Sep. 1996; pp. 563-568; vol. 31. No. 9: Lippincott-Raven Publishers: Philadelphia.

Yuan-Hsiang Chang et al., Computerized Identification of Suspicious Regions for Masses in Digitized Mammograms; Investigative Radiology;Mar. 1996; pp. 146-153; vol. 31, No. 3; Lippincott-Raven Publishers; Philadelphia.

Ioanna Christoyianni et al., Fast Detection of Masses in Computer-Aided Mammography; IEEE Signal Processing Magazine; Jan. 2000; pp. 54-64; vol. 17, No. 1; IEEE Signal Processing Society; Piscataway NJ.

David B. Fogel et al., Linear and Neural Models for Classifying Breast Masses; IEEE Transactions on Medical Imaging; Jun. 1998; pp. 485-488; vol. 17, No. 3; Engineering in Medicine and Biology Society; Piscataway NJ.

Maryellen L. Giger et al., Computerized characterization of mammographic masses: analysis of spiculation; Cancer Letters; 1994; pp. 201-211; vol. 77; Elsevier Scientific Publishers Ireland Ltd.; Ireland.

R. Gupta et al.; The use of tecture analysis to delineate suspicious masses in mammography; Phys. Med. Biol. 1995; pp. 835-855; vol. 40; IOP Publishing Ltd.; UK.

Lubomir Hadjiiski et al.; Classification of Malignant and Benign Masses Based on Hybrid ART2LDA Approach; IEEE Transactions on Medical Imaging; Dec. 1999; pp. 1178-1187; vol. 18, No. 12; Engineering in Medicine and Biology Society; Piscataway NJ.

Lubomir Hadjiiski et al.; Hybrid unsupervised approach for computerized classification of malignant and benign masses on mammograms; Part of the SPIE Conference on Image Processing, San Diego; Feb. 1999; pp. 464-473; vol. 3661; International Society for Optical Engineering; Bellingham WA.

Trevor Hastie et al.; Statistical Measures for the Computer-Aided Diagnosis of Mammographic Masses; Journal of Computational and Graphical Statistics; 1999; pp. 531-543; vol. 8, No. 3; American Statistical Association et al., Alexandria VA.

Zhimin Huo et al; Analysis of spiculation in the computerized classification of mammographic masses; Medical Physics; Oct. 1995; pp. 1569-1579; vol. 22, No. 10; American Institute of Physics; Melville NY.

Zhimin Huo et al.; Robustness of Computerized Scheme for the Classification of Malignant and Benign Masses on Digitized Mammograms; Computer-Aided Diagnosis in Medical Imaging; 1999; pp. 277-280; Elsevier Science B. V. New York.

Zhimin Huo et al; Automated Computerized Classification of Malignant and Benign Masses on Digitized Mammograms; Academic Radiology; Mar. 1998; pp. 155-168; vol. 5, No. 3; Association of University Radiologists; Oak Brook IL.

S. K. Kinoshita et al.; Characterization of breast masses using texture and shape features; Computer-Aided Diagnosis in Medical Imaging; 1999; pp. 265-270; Elsevier Science B. V. New York.

Shuk-Mei Lai et al.; On Techniques for Detecting Circumscribed Masses in Mammograms; IEEE Transactions on Medical Imaging; Dec. 1989; pp. 377-386; vol. 8, No. 4; Engineering in Medicine and Biology Society; Piscataway NJ.

Huai Li et al; Mammographic Mass Detection by Stochastic Modeling and a Multi-Modular Neural Network; SPIE Conference on Image Processing, Newport Beach; Feb. 25-28, 1997; pp. 480-490; vol. 3034; International Society for Optical Engineering; Bellingham WA.

Shih-Chung B. Lo et al; A Multiple Circular Path Convolution Neural Network System for Detection of Mammographic Masses; IEEE Transactions on Medical Imaging; Feb. 2002; pp. 150-158; vol. 21, No. 2; Engineering in Medicine and Biology Society; Piscatawy NJ.

Naga R. Mudigonda et al; Detection of Breast Masses in Mammograms by Density Slicing and Texture Flow-Field Analysis; IEEE Transactions on Medical Imaging; Dec. 2001; pp. 1215-1227; vol. 20, No. 12; Engineering in Medicine and Biology Society; Piscataway NJ.

Naga R. Mudigonda et al; Gradient and Texture Analysis for the Classification of Mammographic Masses; IEEE Transactions on Medical Imaging; Oct. 2000; pp. 1032-1043; vol. 19, No. 10; Engineering in Medicine and Biology Society; Piscataway NJ.

Robert M. Nishikawa et al; Computer-Aided Detection and Diagnosis of Masses and Clustered Microcalcifications from Digital Mammograms; State of the Art in Digital Mammographic Image Analysis; 1994; pp. 82-102; World Scientific Publishing Co., New Jersey.

Nicholas Petrick et al; An Adaptive Density-Weighted Contrast Enhancement Filter for Mammographic Breast Mass Detection; IEEE Transactions on Medical Imaging; Feb. 1996; pp. 59-67; vol. 15, No. 1; Engineering in Medicine and Biology Society; Piscataway NJ.

Nicholas Petrick et al; Unitary Ranking in the Automated Detection of Mammographic Masses; Proceedings of SPIE Conference on Image Processing, Newport Beach; Feb. 25-28, 1997; pp. 522-530; vol. 3034; International Society for Optical Engineering; Bellingham WA.

Nicholas Petrick et al; Automated detection of breast masses on mammograms using adaptive contrast enhancement and texture classification; Medical Physics; Oct. 1996; pp. 1685-1696; vol. 23, No. 10; American Institute of Physics; Melville NY.

Arthur Petrosian et al; Computer-aided diagnosis in mamography: classification of mass and normal tissue by texture analysis; Physics in Medicine and Biology; 1994; pp. 2273-2288; vol. 39; IOP Publishing Ltd.; UK.

Wei Qian et al; Hybrid Adaptive Wavelet-based CAD Method for Mass Detection; proceedings of SPIE Conference on Image Processing, Newport Beach; Feb. 25-28, 1997; pp. 790-801; vol. 3034; International Society for Optical Engineering; Bellingham WA.

Wei Qian et al. Adaptive Directional Wavelet-based CAD Method for Mass Detection; Computer-Aided Diagnosis in Medical Imaging; 1999; pp. 253-259; Elsevier Science B.V. ; New York.

Berkman Sahiner et al; Image feature selection by a genetic algorithm: Application to classification of mass and normal breast tissue; Medical Physics; Oct. 1996; pp. 1671-1684; vol. 23, No. 10; American Institute of Physics; Melville NY.

Berkman Sahiner et al; Classification of Mass and Normal Breast tissue: Feature Selection Using a Genetic Algorithm; Colloquium on Digital Mammography; Feb. 1996: pp. 379-384: Elsevier Science B. V.. New York.

Berkman Sahiner et al; Classification of Mass and Normal Breast Tissue: A Convolution Neural Network Classifier with Spatial Domain and Texture Images; IEEE Transactions on Medical Imaging; Oct. 1996; pp. 598-610; vol. 15, No. 5; Engineering in Medicine and Biology Society; Piscataway NJ.

Guido M. Te Brake et al; Single and Multiscale Detection of Masses in Digital Mammograms; IEEE Transactions on Medical Imaging; Jul. 1999; pp. 628-639; vol. 18, No. 7: Engineering in Medicine and Biology Society; Piscataway NJ.

Celia Varela et al; A set of texture features to differentiate between mass and normal breast tissue on digital mammograms; Computer-Aided Diagnosis in Medical Imaging; 1999; pp. 271-276; Elsevier Science B. V. New York.

Datong Wei et al;Classification of mass and normal breast tissue on digital mammograms: Multiresolution texture analysis; Medical Physics; Sep. 1995; pp. 1501-1513: vol. 22. No. 9: American Institute of Physics: Melville NY.

Datong Wei et al; False-positive reduction technique for detection of masses on digital mammograms: Global and local multiresolution texture analysis; Medical Physics; Jun. 1997; pp. 903-914; vol. 24, No. 6; American Institute of Physics; Melville NY.

Fang-Fang Yin et al; Computerized detection of masses in digital mammograms: Analysis of bilateral subtraction images; Medical Physics; Sep./Oct. 1991; pp. 955-963; vol. 18, No. 5; American Institute of Physics; Melville NY.

Fang-Fang Yin et al; Computerized Detection of Masses in Digital Mammograms: Investigation of Feature-Analysis Techniques; Journal of Digital Imaging; Feb. 1994; pp. 18-26; vol. 7, No. 1; Springer-Verlag New York.

Bin Zheng et al; Computerized Detection of Masses from Digitized Mammograms: Comparison of Single-Image Segmentation and Bilateral-Image Subtraction; Acad Radiol; Dec. 1995; pp. 1056-1061; vol. 2, No. 12; Association of University Radiologists; Oak Brook IL.

Reyer Zwiggelaar et al; Detection of the Central Mass of Spiculated Lesions—Signature Normalisation and Model Data Aspects; IPMI'99, LNCS; 1999; pp. 406-411; vol. 1613; Springer-Verlag Berlin.

R. Zwiggelaar et al; Model-based detection of spiculated lesions in mammograms; Medical Image Analysis; 1999; pp. 1-25; vol. 3, No. 1; Oxford University Press; UK.

Reyer Zwiggelaar et al; Statistical modelling of lines and structures in mammograms; proceedings of SPIE Conference on Image Processing, Newport Beach; Feb. 25-28, 1997; p. 510-521; vol. 3034; International Society for Optical Engineering; Bellingham WA.

Xiao-Hui Wang et al; Computer-assisted diagnosis of breast cancer using a data-driven Bayesian belief network; International Journal of Medical Informatics; 1999; pp. 115-126; vol. 54; Elsevier Science Ireland Ltd.; Irelend.

Bin Zheng et al; Comparison of Artificial Neural Network and Bayesian Belief Network in a Computer-Assisted Diagnosis Scheme for Mammography; International Joint Conference on Neural Networks 1999; Jul. 10-16, 1999; pp. 4181-4185; IEEE; Piscataway NJ.

\* cited by examiner

Calc

|      | Mean   | Variance |
|------|--------|----------|
| FP   | 1.4661 | 0.2282   |
| TP   | 2.1967 | 0.1389   |

Fig 13(a)

Mass

|      | Mean   | Variance |
|------|--------|----------|
| FP   | 1.3776 | 0.1913   |
| TP   | 1.9744 | 0.3173   |

Fig 13(b)

Spiculation

|      | Mean   | Variance |
|------|--------|----------|
| FP   | 1.1173 | 0.948    |
| TP   | 1.4953 | 0.1681   |

Fig 13(c)

Mass / Calc

|    | Colloc | Not Colloc |
|----|--------|------------|
| FP | 0.9354 | 0.0646 |
| TP | 0.8502 | 0.1498 |

Fig 14(a)

Mass / Spic

|    | Colloc | Not Colloc |
|----|--------|------------|
| FP | .8681  | 0.1319 |
| TP | 0.6006 | 0.3994 |

Fig 14(b)

Calc / Mass-Spic

|    | Colloc | Not Colloc |
|----|--------|------------|
| FP | 0.9025 | 0.0948 |
| TP | 0.8338 | 0.1662 |

Fig 14(c)

Spic / Calc

|    | Colloc | Not Colloc |
|----|--------|------------|
| FP | 0.9676 | 0.0324 |
| TP | 0.8763 | 0.1237 |

Fig 14(d)

Spic / Mass

|    | Colloc | Not Colloc |
|----|--------|------------|
| FP | 0.8649 | 0.1351 |
| TP | .3454  | .6546 |

Fig 14(e)

INFORMATION FUSION WITH BAYES NETWORKS IN COMPUTER-AIDED DETECTION SYSTEMS

CROSS REFERENCE TO RELATED APPLICATION

This invention claims benefit of U.S. Provisional filing, Ser. No. 60/333,825, filed Nov. 20, 2001.

BACKGROUND OF THE INVENTION

1. Field of the Invention

This invention pertains to methods of combining multiple types of information in computer-aided detection (CAD) systems.

2. Description of the Prior Art

Mammographic CAD systems have existed in research environments since the 1960's. Currently available systems find indicators of cancer in mammograms. Typical indicators are clusters of microcalcifications, masses, and spiculated masses. Each indicator may be detected with a specific processing channel. Each channel provides a set of detected regions considered as potentially cancerous. Various methods have been described for combining sets of detections from multiple channels.

The issue of combining multiple detectors in a CAD system has been addressed in prior US patents. Rogers et al, in U.S. application Ser. No. 09/602,762 describe a method for combining outputs of microcalcification and density channels. Case Based Ranking (CBR) limits the total number of marks in a case by retaining only the "best" subset. Additional limits are applied to the total number of marks per image and the total number of each type of mark allowed on any one image of the case. In application Ser. No. 09/602,762, the ranking is based on a difference of discriminants score, which is proportional to the probability of cancer.

Roehrig et al, in U.S. Pat. No. 6,198,838 describe a method for combining outputs of two independent channels: mass detector and spiculation detector. Each detector processes the image, detects regions of interest (ROIs), and computes sets of mass and spiculation feature vectors characterizing the ROI. The combining method taught by Roehrig consists of concatenating mass and spiculation information into a feature vector, then applying it to a classifier. ROIs passing the classifier are then displayed as final detections.

In Roehrig et al, the simple concatenation of features from distinct channels has one very undesirable effect. The probability distributions of the cancer/not cancer concatenated feature are more confusable than either of the original feature vectors. This is because both spiculated and non-spiculated lesions are represented by a single feature vector consisting of mass and spiculation elements. The features specific for spiculatedness will be "noiselike" for regions of interest containing masses. Similarly, the massness features will be noiselike for regions containing spiculations. Assuming an equal number of massness and spiculatedness features, half of the features for any lesion will be noise. The end result is a reduction in classifier accuracy in a fielded system.

Viewed from a different perspective, the classifier is forced to consider masses and spiculated masses as a single "cancer" category. Since feature vectors derived from independent and possibly orthogonal sources, the values of feature vectors in the "cancer" category are dispersed over a larger volume of feature space than would be required if the separate classifiers were applied for the mass and spiculated mass channels.

To achieve higher classification accuracy in CAD systems, there is clearly a need for an improved method to combine lesion information.

SUMMARY OF THE INVENTION

The present invention provides a means for computing a probability of malignancy for a lesion by combining multiple types of lesion information and, in particular, provides a system and method for combining information obtained from detections relating to different lesion-types to provide an output comprising a final display of suspicious lesions. Plural channels are provided for detecting and processing information specific to each lesion-type and, in the preferred embodiment, the channels correspond to calcifications, masses and spiculations. Each channel includes a tuned detector, classifier, and Bayes network wherein the outputs of the Bayes networks are probabilities of malignancy. The malignancies are rank ordered in a rule based post-processing operation to provide the final display of suspicious lesions.

According to one aspect of the invention, a method of detecting malignancy of a lesion is provided, comprising the steps of: computing evidence from each lesion, providing the evidence to a Bayes network, and computing a probability of malignancy for each lesion.

According to another aspect of the invention, a method for use in a CAD system for providing detections of suspicious lesions is provided, wherein the method provides for selection of lesions for final display and comprises the steps of: calculating a probability of malignancy for each lesion, and using the probability of malignancy as a selection criteria affecting a final display of suspicious lesions.

According to yet another aspect of the invention, a method of detecting malignancy of a lesion is provided, comprising the steps of: using independent lesion-type specific detectors to detect lesions, computing lesion-type specific evidence corresponding to each detected lesion, providing the lesion-type specific evidence to lesion-type specific Bayes networks, and computing a lesion-type specific probability value relating to malignancy for at least some of the detected lesions.

According to a further aspect of the invention, A method of enhancing image regions corresponding to spiculations comprising: providing a set of line kernels and a set of spiculation kernels, filtering a medical image with the set of line kernels to create a binary line response image and an angle orientation image, removing spurious lines from the line response image producing a pruned line image, separating lines in the pruned line image according to directions specified by the angle orientation image to produce a set of orientation specific line images, multiplying the orientation specific line images with the medical image to produce a set of intensity-weighted line images, filtering the intensity-weighted line images with the set of spiculation kernels to produce a set of spiculation response images, and storing the maximum spiculation response value at each pixel location, producing an image with enhanced spiculations.

According to another aspect of the invention, a method for detecting spiculations in a medical image is provided, comprising: providing a set of line kernels and a set of spiculation kernels, filtering a medical image with the set of line kernels to create a binary line response image and an angle orientation image, removing spurious lines from the line response image producing a pruned line image, separating lines in the pruned line image according to directions specified by the angle orientation image to produce a set of orientation specific line images, multiplying the orientation specific line images with the medical image to produce a set of intensity-weighted line images, filtering the intensity-weighted line images with the set of spiculation kernels to produce a set of spiculation response images, storing the maximum spiculation response value at each pixel location, producing a spiculation image, and thresholding the spiculation image to produce image regions containing spiculations.

Other objects and advantages of the invention will be apparent from the following description, the accompanying drawings and the appended claims.

BRIEF DESCRIPTION OF THE DRAWINGS

FIG. 13 shows means and variances for Calc, Mass, and spiculation discriminant scores.

FIG. 14 shows conditional probability tables of collocation for the Calc, Mass, and Spiculation channels.

DETAILED DESCRIPTION OF THE PREFERRED EMBODIMENT

The primary advantage of this invention is obtained by providing an information fusion method for multiple indicators of cancers detected with multiple channels. Each channel is lesion type specific and comprises specifically tuned detectors, features, classifiers and Bayes networks. The outputs of the Bayes networks are probabilities of malignancy for the detections passing the corresponding classifier. These probabilities are rank ordered in a rule based post-processing step to provide final CAD system outputs.

Figure 1:
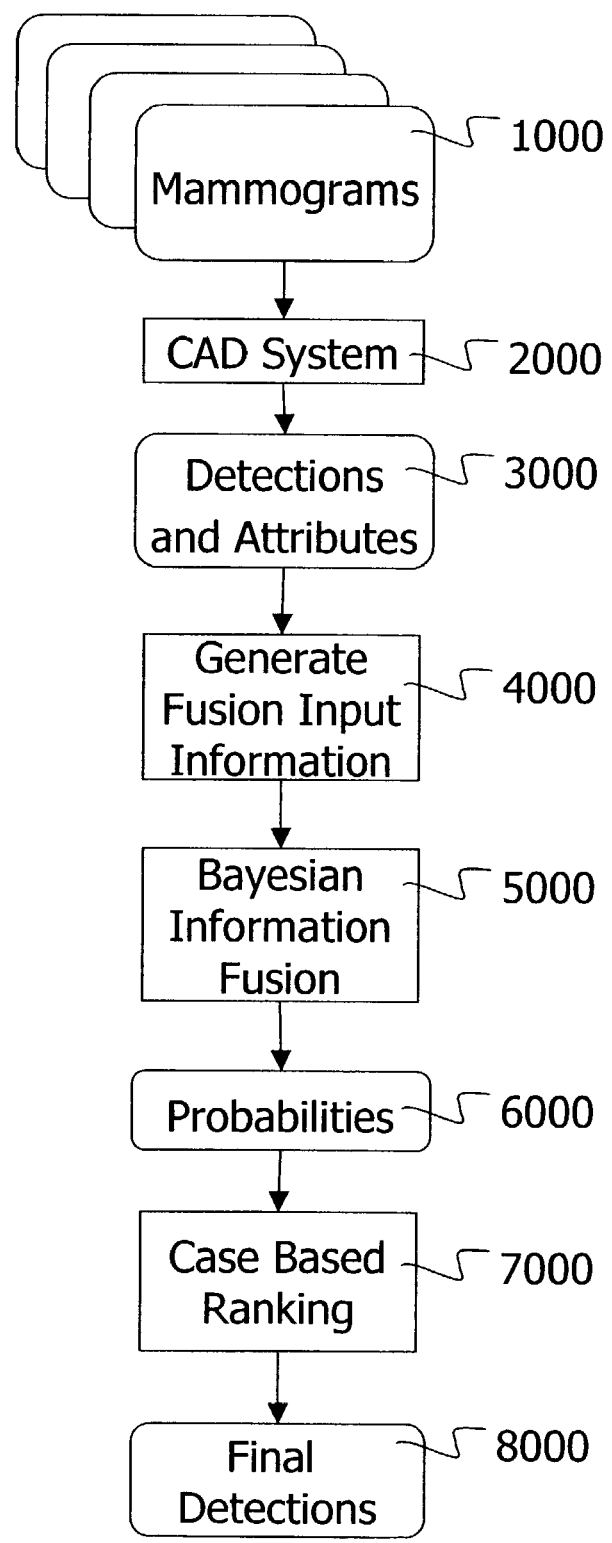
FIG. 1 is an overview of the invention.

FIG. 1 shows an overview of the system. Mammograms, 1000, are obtained during a radiologic exam. The output of the exam may be either a set of films or a set of digital images depending on the type of equipment used during the exam. When the mammograms are films, the CAD system, 2000, uses a film digitizer to generate digital images of each film for subsequent analysis. When the mammograms are created by a full field digital mammography (FFDM) system, the digitization step is not required and the CAD system operates directly on the digital images. The mammograms are processed by the CAD system, producing a set of output detections and associated attributes, 3000. In the prior art, as in Roehrig, such an output provides final detections. In this invention, additional attributes are associated with each detection which are then used to generate fusion information, 4000. The fusion information is input to a Bayesian Information Fusion step, 5000. In this step, probabilities of cancer, 6000, are computed for each detection. We will show that the union of the Generate Fusion Input Information and Bayesian Information Fusion steps, 4000 and 5000, with the preceding and subsequent steps is an important aspect of this invention. The detections are ranked by probabilities and cancer categories in the Case Based Ranking step, 7000. This step limits the number of detections to a maximum number per category per case, producing the final set of detections, 8000. Each element is now described in more detail.

Figure 2:
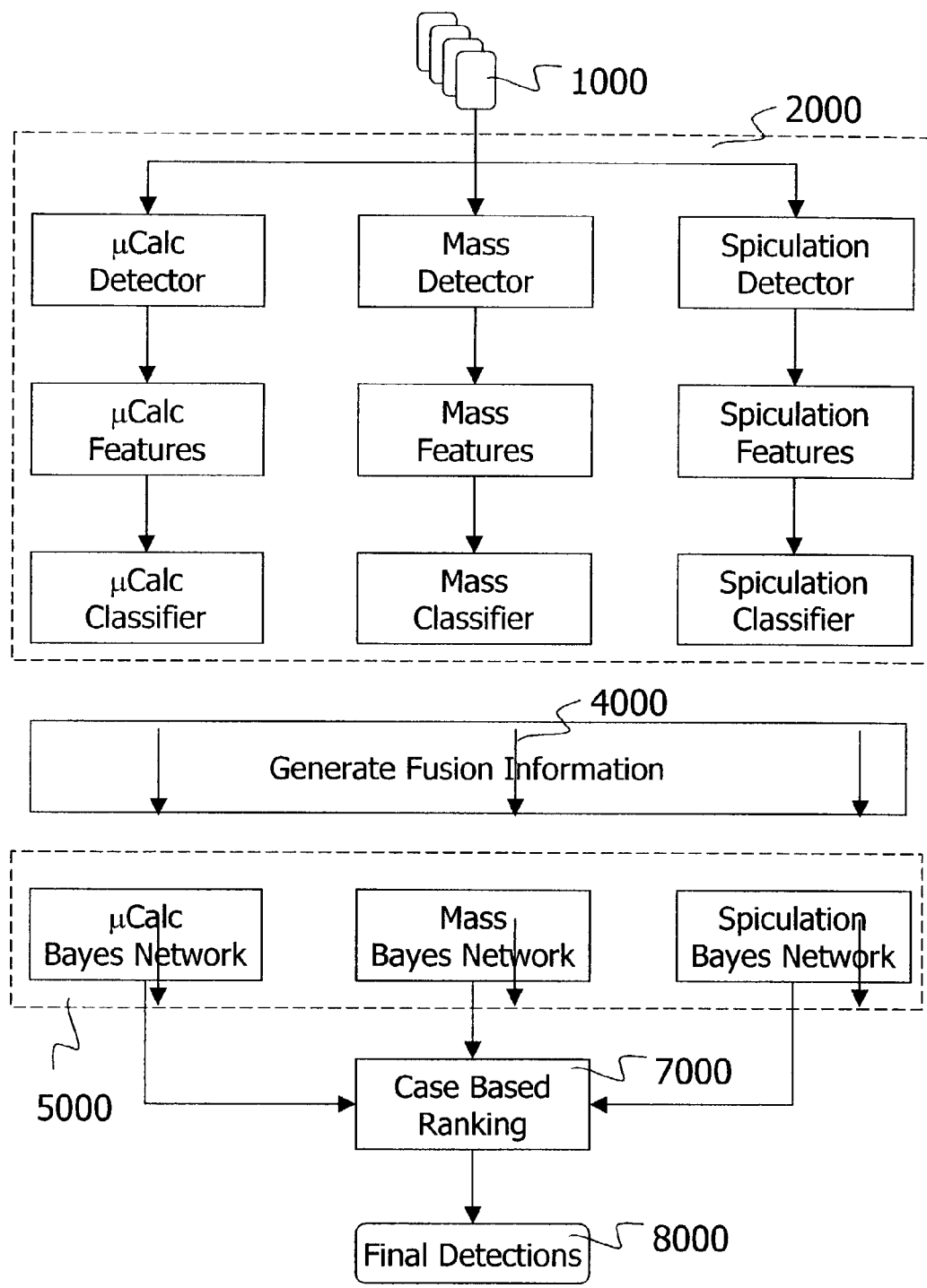
FIG. 2 shows a CAD system with independent channels, and information fusion by Bayes Networks and Case Based Ranking.

The invention applied to a CAD system is shown in FIG. 2. CAD systems typically provide separate channels for each category of cancer to be detected, as shown in the dashed box, 2000. Here we show a three channel system. The left channel detects and classifies microcalcification regions of interest (ROIs). The center channel detects and classifies mass ROIs. The right channel detects and classifies spiculation ROIs. The first two steps in each channel are to detect potential lesions and compute features for each ROI. The third step provides ROI classification within each channel. The classifiers output difference of discriminant scores for each ROI. Prior to computing context information, 4000, the number of detections per image is limited to a predetermined maximum value per category, not shown. This limiting improves the quality of subsequent context information. In a preferred embodiment, the microcalcification channel is limited to two detections per image, while the mass and spiculation channels are limited to three detections per image. The discriminant scores and other information comprise evidence input to corresponding Bayes networks, 5000, as the final step within each channel. The Bayes networks compute the probability of cancer for each ROI. The probability scores are passed to the Case Based Ranking step, 7000. Here, ROIs are rank ordered and rules applied for restricting the number of detections per case for different indicators of cancer. The output of post processing is a final set of ROIs, 8000. The final detections are displayed to assist a radiologist in the detection of cancer.

The microcalcification and mass channels, the left and center channels in FIG. 2, have been described in U.S. application Ser. No. 09/602,762, filed Jun. 23, 2000, which application is assigned to the assignee of the present application and is incorporated herein by reference. Although context fusion is general and may be applied to a system with only two channels, such as mass and microcalcification, a preferred embodiment of the present application additionally includes a spiculation channel as the third indicator of cancer which is now described in further detail.

Spiculation Channel

Figure 3:
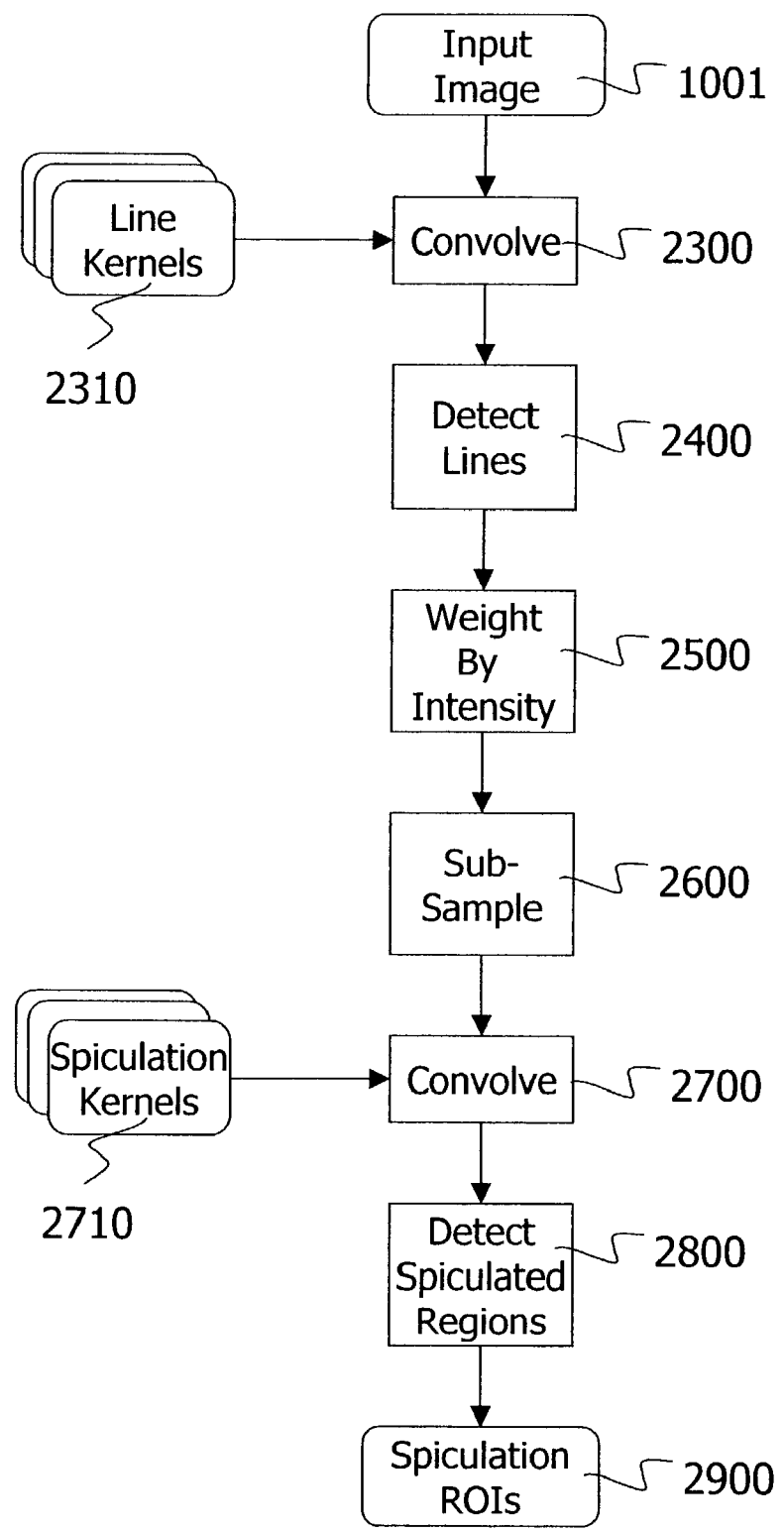
FIG. 3 shows a system to detect spiculations.

An overview of the spiculation detector is shown in FIG. 3. Preprocessing, not shown here, is applied to the set of input images as described in U.S. application Ser. No. 09/602,762. The spiculation channel operates on images with approximately 175 micron pixel spacing. Line kernels of eight different orientations, 2310, are convolved with the input image, 1001, in step 2300. Lines are detected in the step 2400. Detected line images are formed at each of the eight orientations. The detected line images are then weighted by the original image intensity in step 2500.

Weighting by original image intensity reduces the contribution of lines with low intensity. Using the raw intensity at any stage beyond the initial line detection is considered undesirable when striving for a robust system design. However, if the spiculation system had to rely solely on binary line images to detect spiculation it would result in many false positives detections in dim, low contrast regions. To eliminate this problem the line images are weighted by the original image intensity. In so doing, a variable level of importance is established to the line structure. The importance is directly related to the intensity of the detected lines.

After weighting by original image intensity, the detected line images are then subsampled by a factor of four in each dimension, step 2600. A set of spiculation kernels, 2710, which detect regions of diametrically opposed radiating lines, are convolved with the subsampled line images in step 2700. Regions with large responses to the spiculation kernels are detected in step 2800, producing a set of spiculation ROIs, 2900. Each step in the spiculation detector is now described in more detail.

Line Detection

Figure 4:
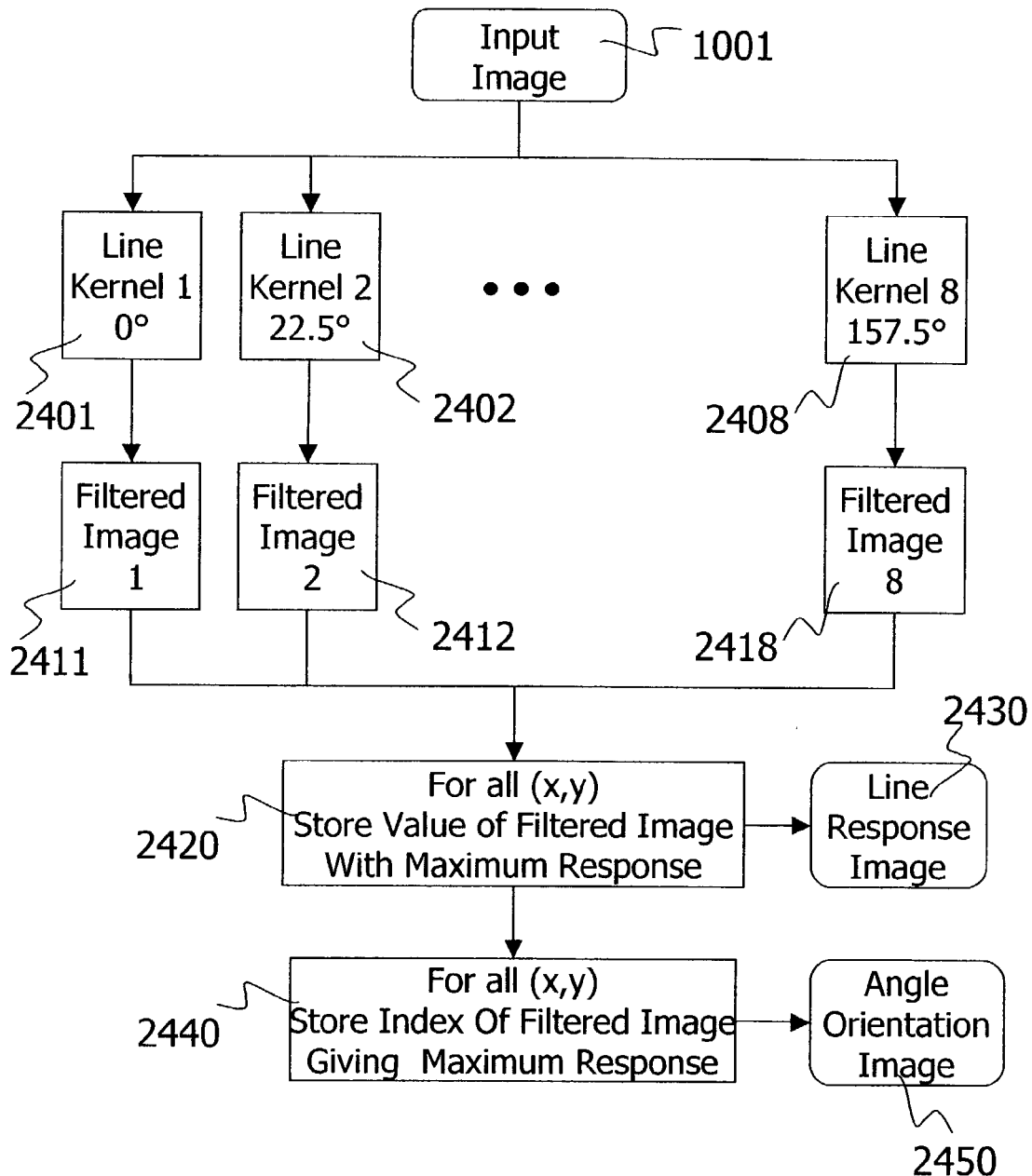
FIG. 4 is a block diagram of a line detection method.
Figure 5:
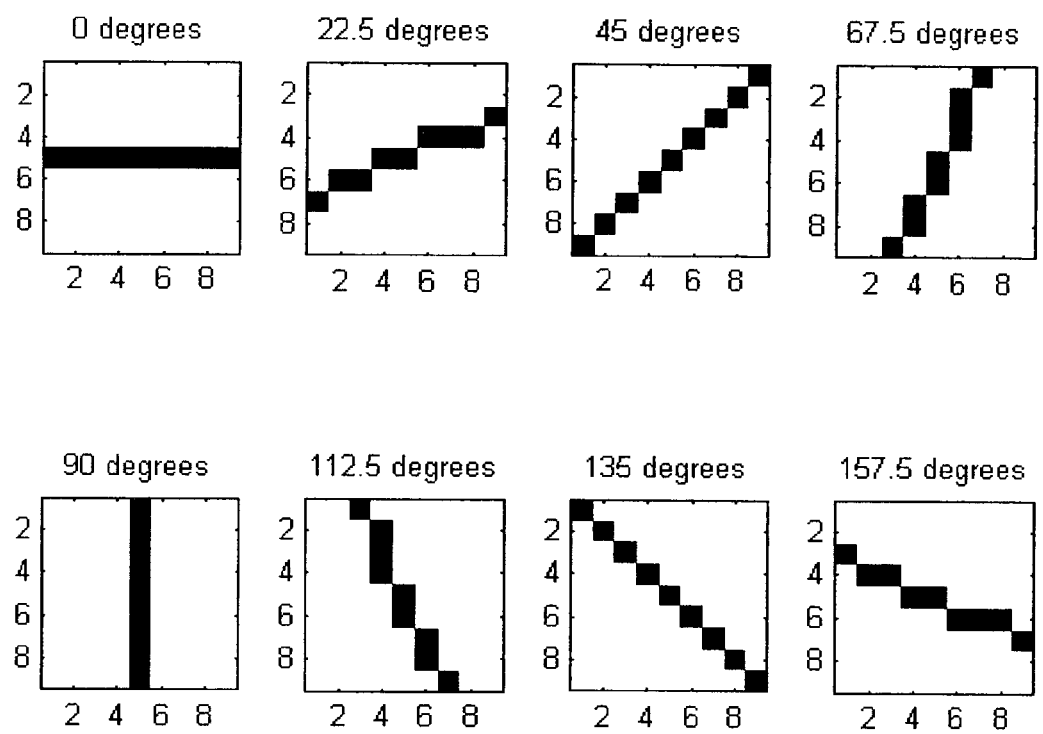
FIG. 5 illustrates line kernels.

An overview of the line detection algorithm is shown in FIG. 4. First, eight line kernels are convolved with the input image. The kernel orientations span 180 degrees in 22.5 degree steps. Each kernel consists of a single pixel width line at eight different orientations in a 9 by 9 pixel window, normalized to zero mean. The line kernels are shown in FIG. 5.

Referring again to FIG. 4, convolving an input image, 1001, with the set of line kernels, 2401 through 2408, produces a set of eight filtered images, 2411 through 2418. Let the $n^{th}$ filtered image be denoted by $I_n(x,y)$. Then, the line response image, $L(x,y)$, and angle response image, $A(x,y)$ are formed as:

$$L(x,y) = \max_n \{I_n(x,y)\}; n=1, \ldots, 8 \quad (1)$$

$$A(x,y) = \text{argmax}_n \{I_n(x,y)\}; n=1, \ldots, 8 \quad (2)$$

Equation 1 shows the value of the line response image at location (x,y) is selected as the maximum response across the eight filtered images at that location. Equation 2 shows the value of the angle response image at location (x,y) is the index of the filtered image that provided the maximum response.

In step 2420 the maximum values from the set of filtered images at each (x,y) location are stored to form the line response image, 2430. In step 2440, the index of the filtered image providing the maximal response is stored, producing the angle orientation image, 2450.

Figure 6:
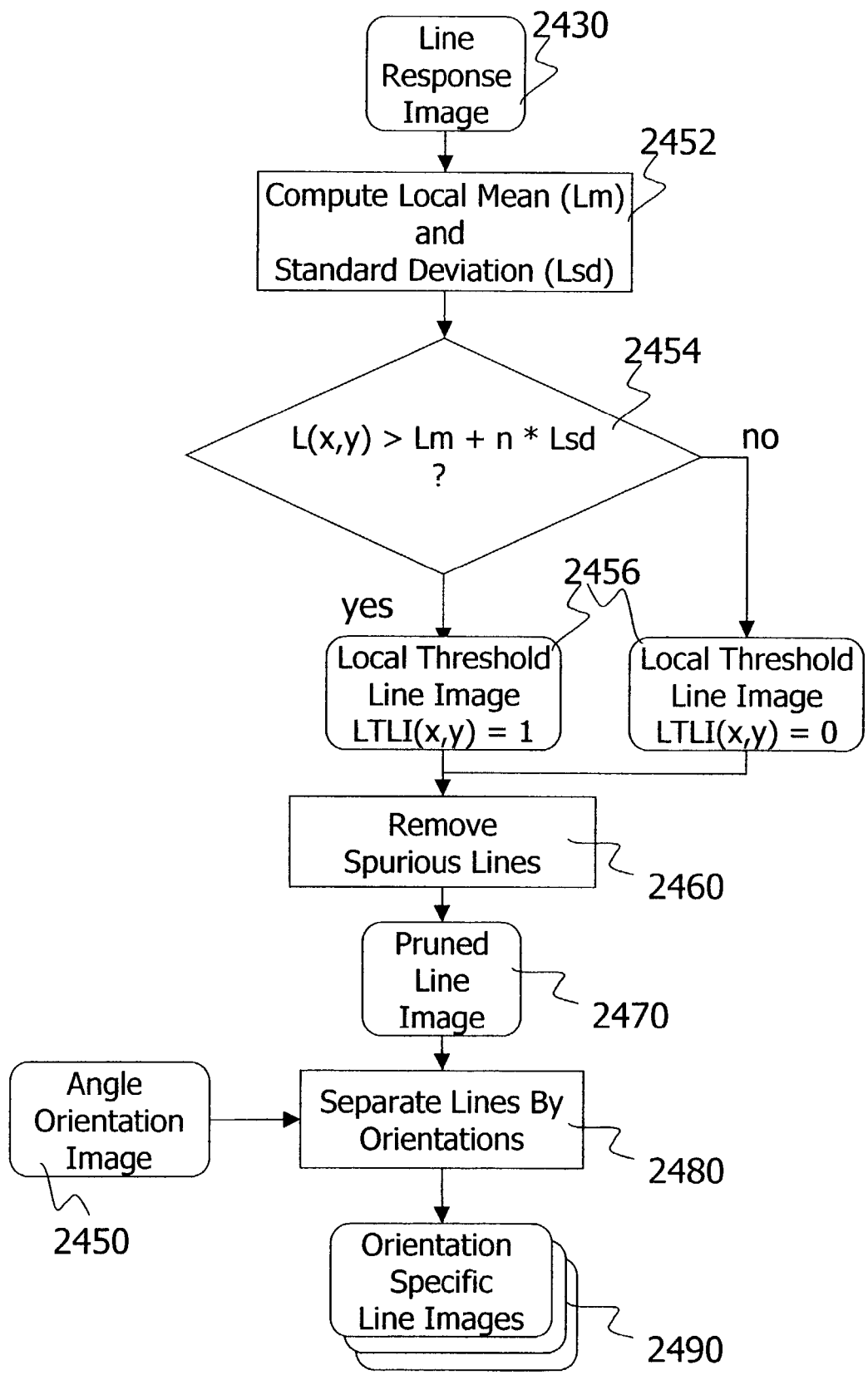
FIG. 6 is a block diagram for the method of generating orientation specific line images.

A local constant false alarm rate (CFAR) thresholding method is applied to detect lines from the line response image, as shown in FIG. 6. The local mean and standard deviation of the line response image, 2430, are computed in a 21 by 21 pixel neighborhood centered at pixel location (x,y) in step 2452. In step 2454, the pixel under test, $L(x,y)$, is compared to a local threshold, in a preferred embodiment computed as the local mean plus 0.5 times the local standard deviation. If $L(x,y)$ is greater than the threshold, location (x,y) of the local thresholded line image, 2456, is set to '1', otherwise, location (x,y) is set to '0'.

Figure 7:
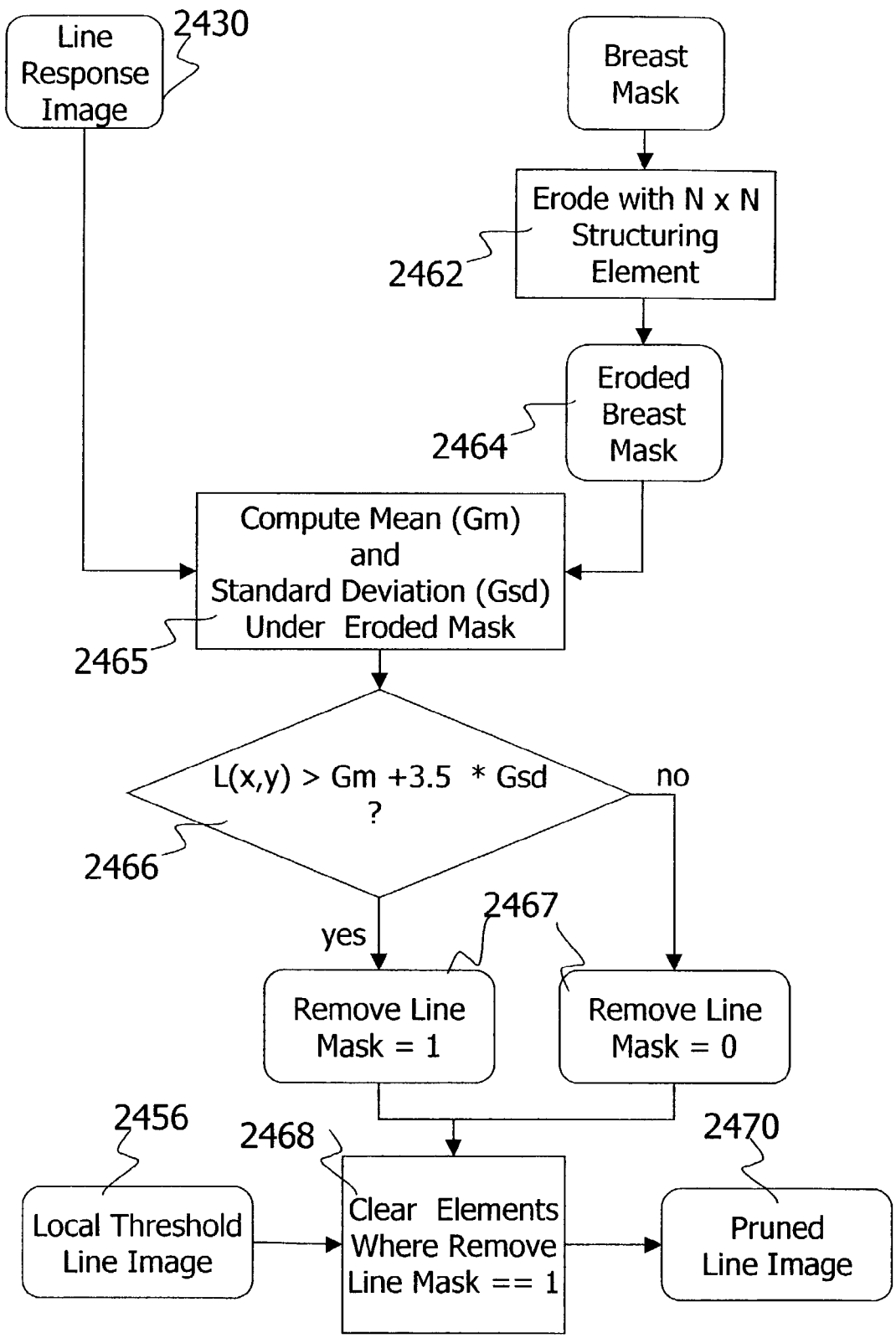
FIG. 7 shows the method for removing spurious lines.

The local threshold line image may have unwanted lines detected at areas in the original image with high intensity or contrast, such as along the chest wall or the skin-air line. These types of spurious lines are removed in step, 2460, shown in FIG. 7.

The line removal algorithm requires as inputs the breast mask, computed in a pre-processing step, the line response image, 2430, and the local threshold line image, 2456. The breast mask, a binary image with values of '1' corresponding to regions of breast tissue and '0' elsewhere, is eroded by N=31 pixels, in step 2642. Erosion produces a smaller, eroded breast mask, 2464, free from the artifacts that we are trying to remove. The global mean and standard deviation in the line response image is calculated from the area of the eroded breast mask in step 2465. The spurious lines are then detected and removed by determining the lines that are statistical outliers. A global threshold is computed, in a preferred embodiment, as $$T = \text{global mean} + 3.5 * \text{global standard deviation}$$

and applied in step 2466. For pixels (x,y) in the line response image greater than the threshold T, the remove line mask image, 2467, at location (x,y) equals '1'. Otherwise location (x,y) of the remove line mask image equals '0'. In step 2468, the remove line image mask is applied to the local threshold line image, 2456. Pixels in the local threshold line image are cleared, that is set to '0', at pixel locations for which the remove line mask image equals '1'. This step effectively removes spurious lines detected due to the chest wall and the skin-air line, producing a pruned line image, 2470.

Referring again, to FIG. 6, the final step of the line detection method is to separate the lines by orientation, 2480. This is accomplished by associating each 'on' pixel in the pruned line image 2470 to an orientation using the angle orientation image, 2450. This step produces eight orientation specific line images, 2490, for subsequent use in the spiculation detector.

Spiculation Detection

Figure 8:
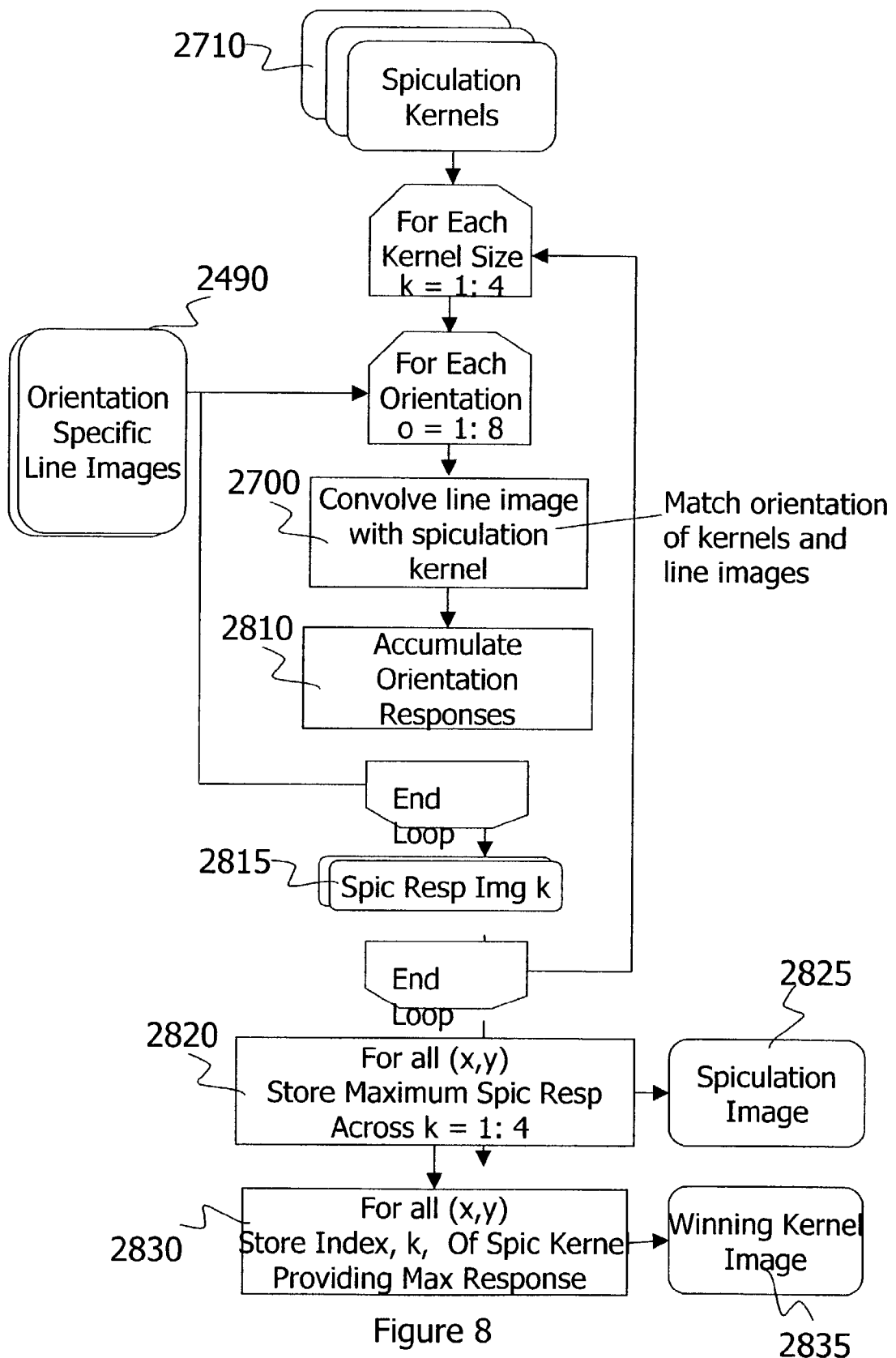
FIG. 8 is a block diagram for the method of creating a spiculation image.

A block diagram of the spiculation detection method is shown in FIG. 8.

The role of the spiculation detector is to identify regions exhibiting diametrically opposed radiating line structure. The inputs to the spiculation detection method are the set of spiculation kernels, 2710 and the set of orientation specific line images, 2490. In a preferred embodiment, there are four sizes of spiculation kernels oriented at eight angles.

Each orientation specific line image is convolved with an associated orientation specific spiculation kernel of specified edge length in step 2700. The response is accumulated across the range of orientations, step 2810. In this embodiment, four spiculation response images are created, one for each spiculation kernel size. The set of spiculation response images are shown in box 2815. In step 2820, a spiculation image, 2825, is created by keeping the maximum response from the set of spiculation response images at each (x,y) pixel location. In step 2830, the index of the spiculation kernel providing the maximum response of step 2820 is stored, producing the winning kernel image, 2835.

Figure 9:
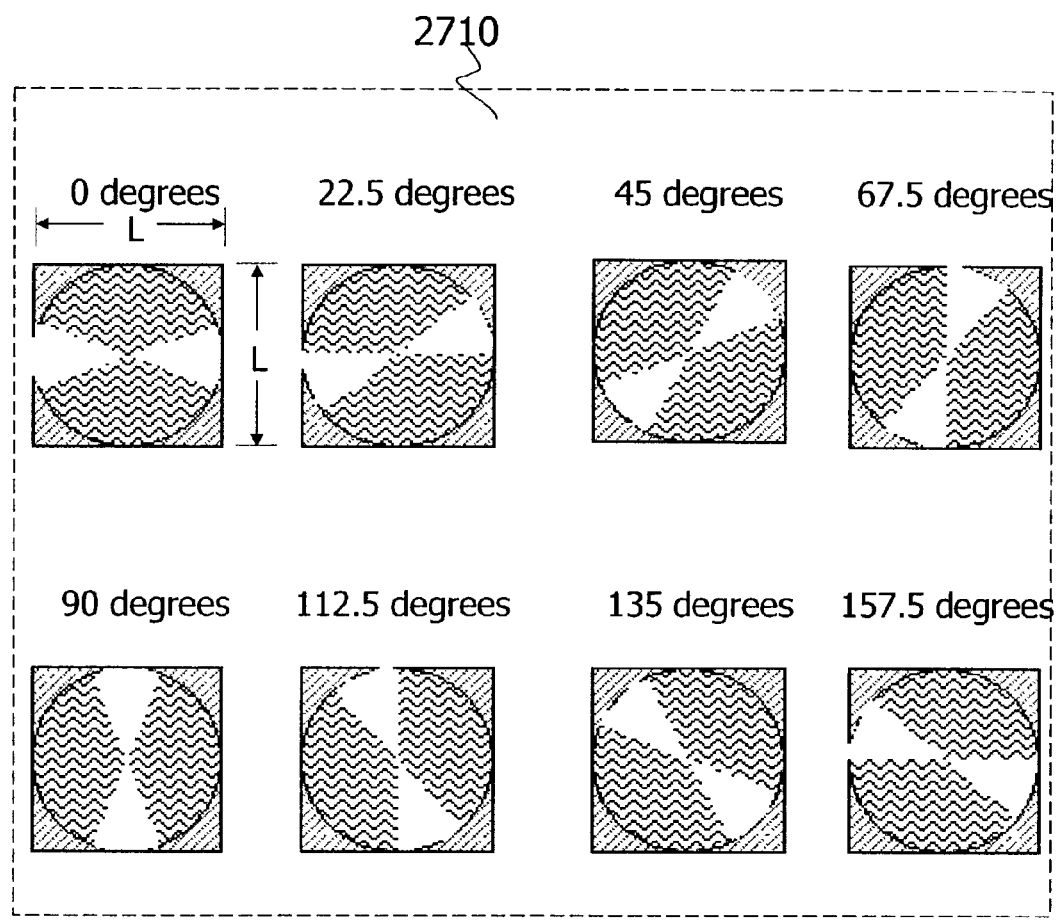
FIG. 9 illustrates spiculation kernels.

Referring to FIG. 9, each spiculation kernel consists of a disc with wedges at a specific orientation, corresponding to a line kernel orientation. In the hashed regions outside the disc, the kernel has zero contribution, the white wedges denote a constant positive contribution, and the wavy wedges denote a constant negative contribution. Each of the kernels are zero mean. The positive wedges span 45 degrees, and are oriented from 0 to 180 degrees in steps of 22.5 degrees. To detect a range of sizes, four sizes of spiculation kernels are used. The spiculation kernels are square windows with edge lengths, L, of 15, 25, 35, and 45 pixels.

Figure 10:
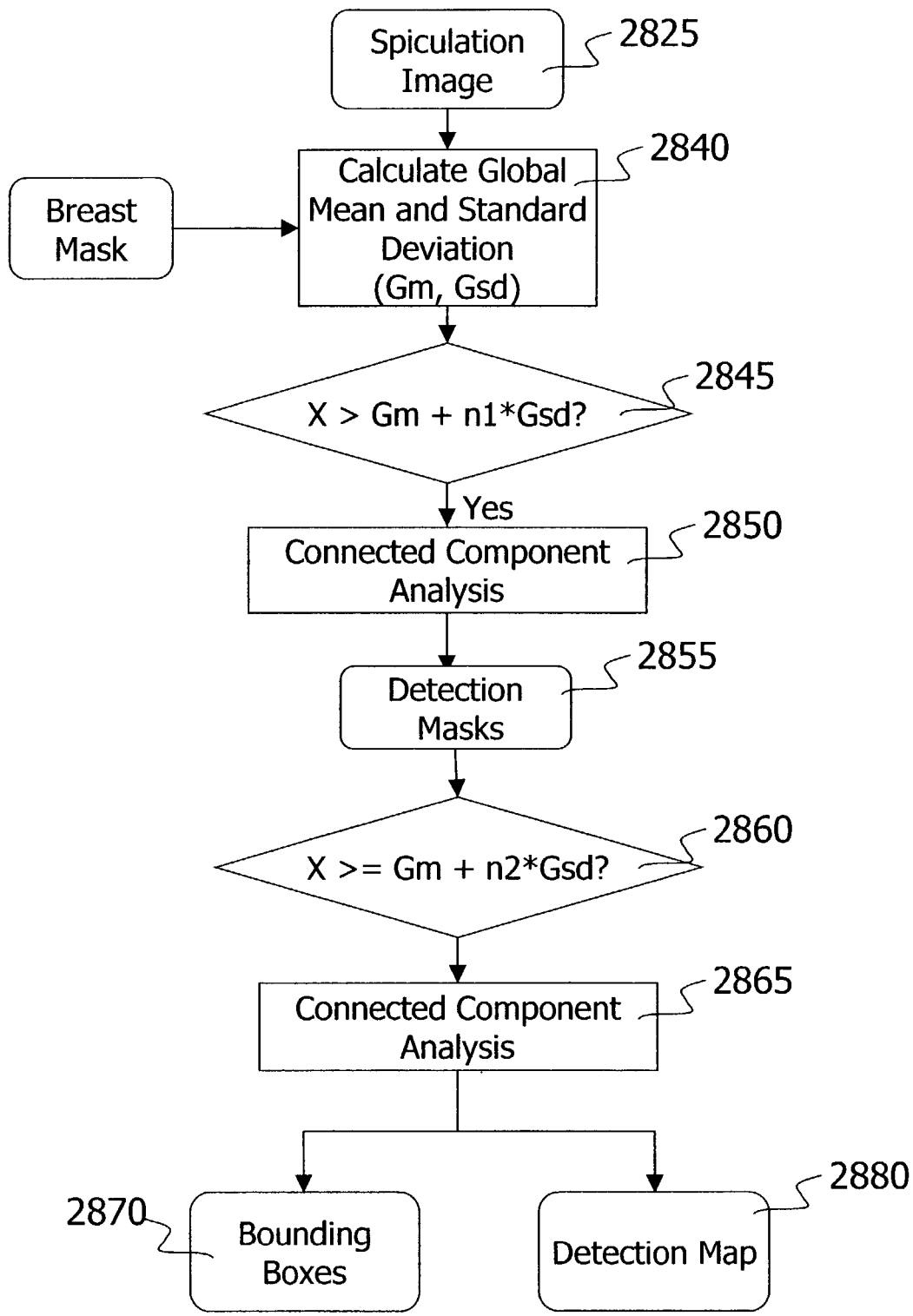
FIG. 10 is a block diagram for the spiculated region detector.

Given the spiculation image 2825, detections must be created. A block diagram of the method is given in FIG. 10. The region of interest (ROI) detector for the spiculation system is a global CFAR. The global mean, Gm, and standard deviation Gsd, are calculated over the breast tissue area of the spiculation response image in step 2840. If the spiculation response for a given pixel is greater than Gm+n1*Gsd, then the pixel is retained as part of an ROI. In a preferred embodiment, n1=4.5. Connected component analysis, step 2850, groups pixels satisfying the threshold into a set of distinct objects where an object is a set of adjacent pixels (4 or 8 connected), producing a set of binary detection masks, 2855. The binary detection masks indicate the location and extent of detections in the spiculation image. The detection masks are rectangular and bound each object from the connected component analysis. Pixels in the mask corresponding to image locations exceeding the threshold of step 2845 are set to '1'.

The spiculation image is re-thresholded in step 2860. A second threshold is computed as Gm+n2*Gsd with n2=3.0. Connected component analysis of the re-thresholded image provides a second set of detections. Only those re-thresholded detections containing an object from the first thresholding are retained.

The outputs are bounding boxes, 2870, and detection maps, 2880, for the re-thresholded objects. A detection map is a binary mask with '1's indicating pixel locations corresponding to the re-thresholded object. The bounding box is specified as the row and column coordinates of the upper left and lower right corners of a rectangle sized to circumscribe the object.

Bayes Network

Figure 11:
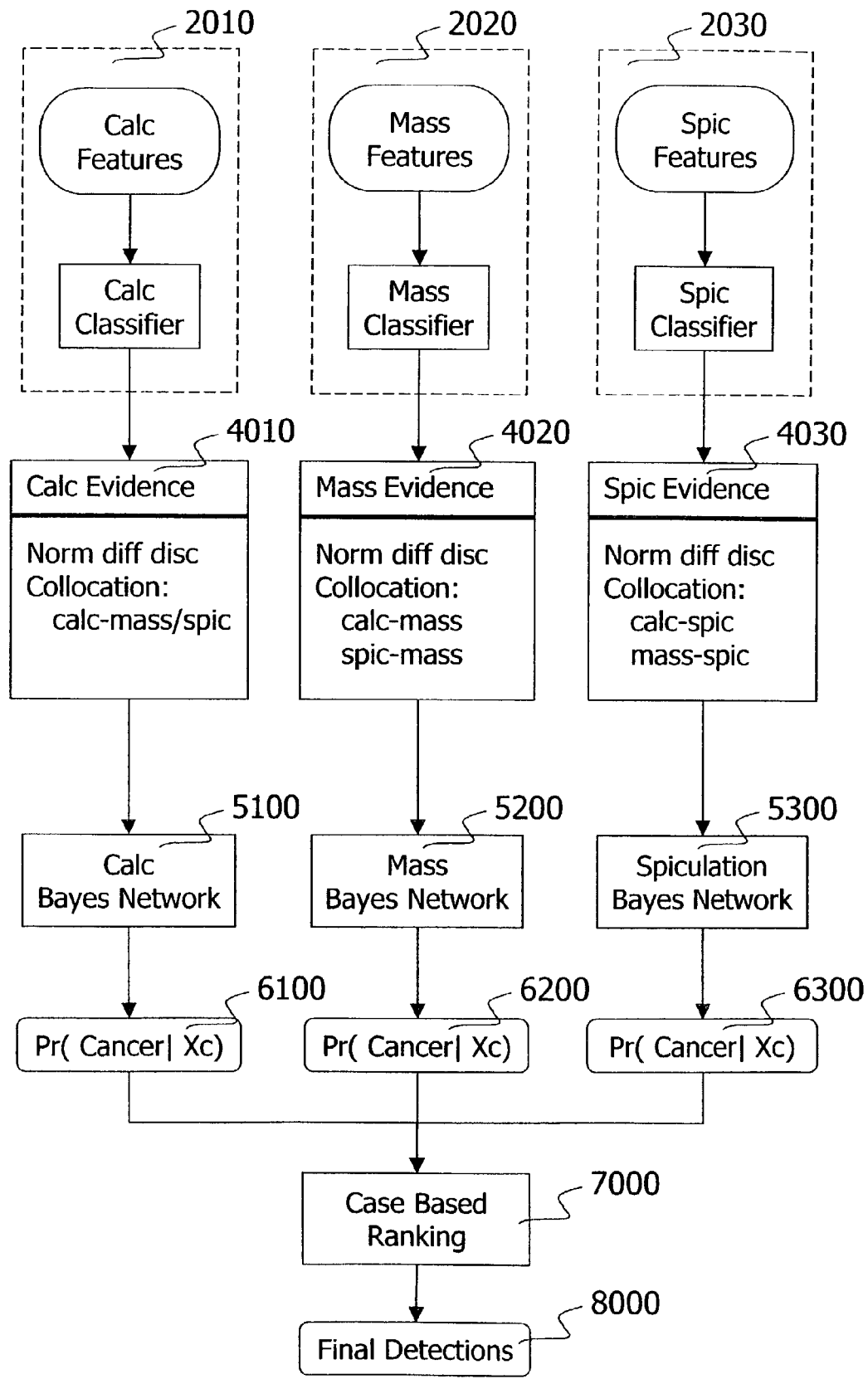
FIG. 11 illustrates the architecture of the CAD system with Bayes Networks incorporated into each channel.

FIG. 11 shows how Bayes networks are used in this invention. The individual channels, 2010, 2020, and 2030, detect specific types of lesions. Features are computed and applied to corresponding classifiers, producing discriminant scores. The discriminant scores and other information are used as evidence, 4010, 4020, and 4030, for the Bayes networks, 5100, 5200, and 5300, within each channel. The Bayes networks compute probabilities of cancer given the evidence, 6100, 6200, and 6300. These probabilities are provided to a Case Based Ranking step, 7000, to produce final detections, 8000.

Bayes Network Evidence

Many different possible types of information are potentially useful as evidence to Bayes networks. In a preferred embodiment, shown in FIG. 11, steps 4010, 4020, and 4030 show two basic types of evidence: normalized difference of discriminants, and collocation indicators. Each of these are now described. Normalized differences of discriminants are computed as follows. First, classifiers are trained in each channel as described in application Ser. No. 09/602,762, producing two discriminant functions and a threshold value for each indicator of cancer. Within each channel, the true positive (TP) discriminant corresponds to the classifier representing that channel's category and the false positive (FP) discriminant to the non-TP categories. Discriminant scores are equivalent to distances from prototypical examples. For example, if in the calc channel a detection produces a small TP discriminant and a large FP discriminant, the detection is more likely to be a calc than not. Within each channel, the normalized difference is computed by first subtracting the TP from the FP discriminant. Then, the threshold value is subtracted from the difference of discriminants score and the result raised to a power transform value. In the calc and mass channel, the power transform value equals 0.35; in the spiculation channel, the power transform value is 0.25.

Collocation indicators are binary units of evidence. A collocation indicator is set to '1' if a detection in one channel overlaps a detection in another channel.

The specific evidence used in the Bayes networks of each channel is now described.

Calc Bayes Network

Figure 12A:
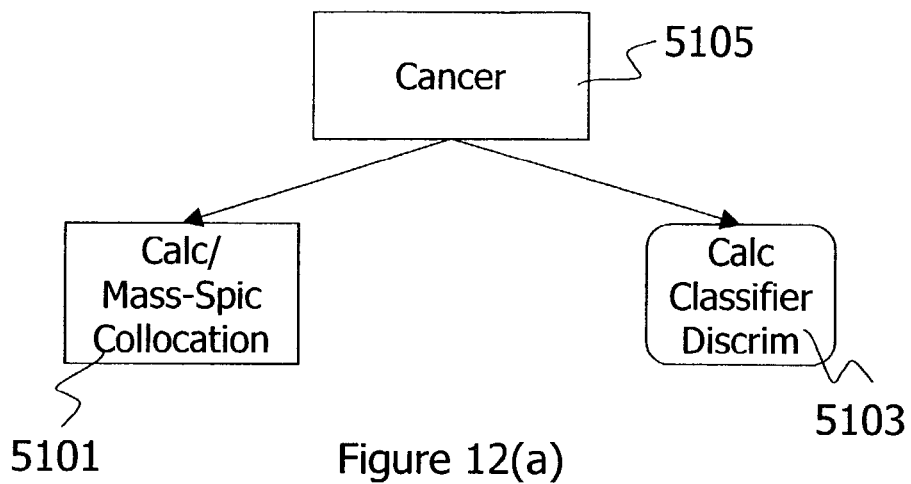
FIG. 12 shows Bayes network topologies for the Calc, Mass, and Spiculation channels.
Figure 12B:
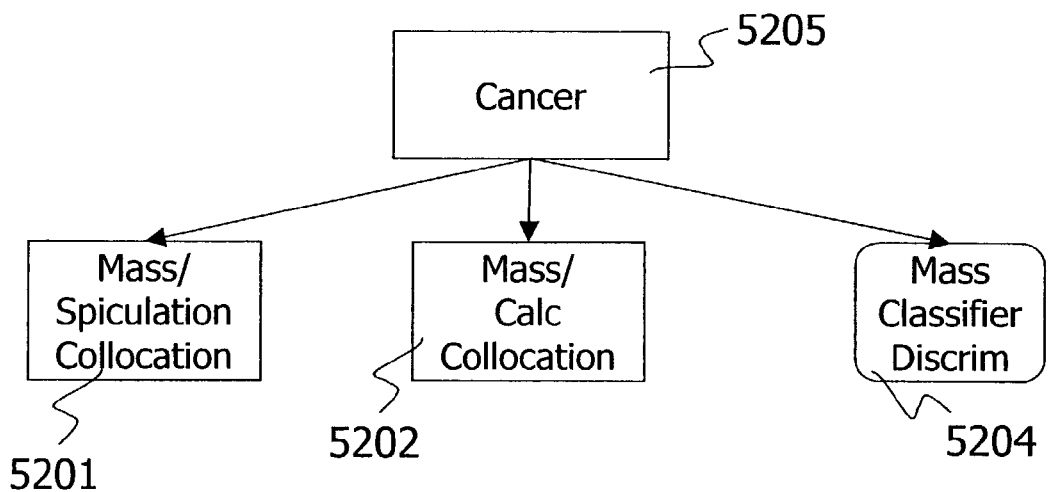
Figure 12C:
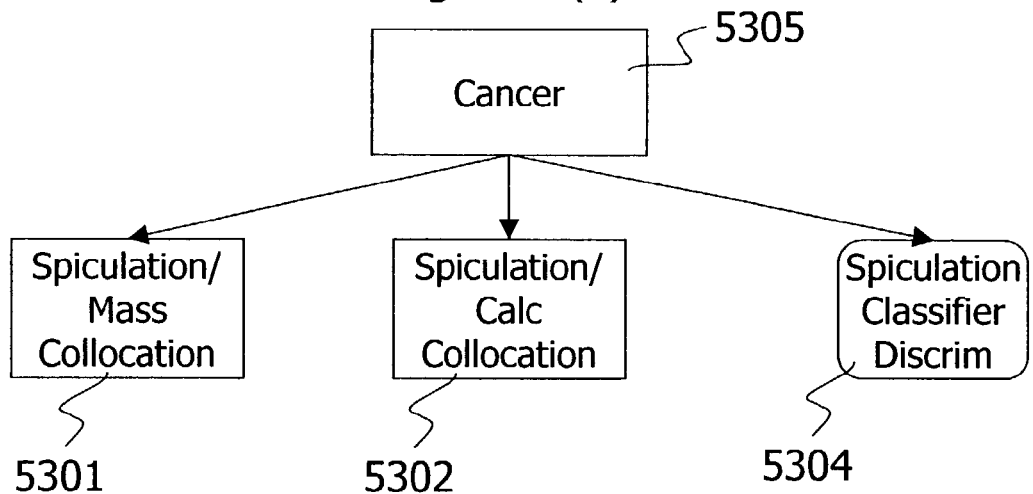

In the calc channel, the normalized difference of discriminants and a collocation indicator are input to the Calc Bayes network. The collocation indicator is '1' for calc detections overlapping either a mass or spiculation detection. The topology of the Mass Bayes Network is shown in FIG. 12(*a*).

Mass Bayes Network

In the mass channel, the normalized difference of discriminants and two collocation indicators are input to the Mass Bayes network. The first collocation indicator is '1' for mass detections overlapping a microcalcification detection. The second collocation indicator is '1' for mass detections overlapping a spiculation detection. The topology of the Mass Bayes Network is shown in FIG. 12(*b*).

Spiculation Bayes Network

In the spiculation channel, the normalized difference of discriminants and two collocation indicators are input to the Spiculation Bayes network. The first collocation indicator is '1' for spiculation detections overlapping a microcalcification detection. The second collocation indicator is '1' for spiculation detections overlapping a mass detection. The topology of the Spiculation Bayes Network is shown in FIG. 12(*c*).

Calculating Probabilities

The evidence for each ROI is supplied to the Bayes Network, and the probability of cancer is calculated for each ROI. The probability calculation requires conditional probability distributions or functions to be estimated from a set of training data. That is, the evidence is tabulated for detections of known "cancer" or "not cancer" categories. In a preferred embodiment, let the conditional distributions resulting from training data be as shown in FIGS. 13 and 14. The conditional distributions of the normalized difference of discriminants is assumed to be Gaussian, and therefore specified by mean and variance. FIG. 13 shows the mean and standard variance values for the three channels. The remaining evidence is discrete, and represented in conditional probability tables. FIG. 14 shows the conditional probability tables for the collocation evidence. Collocation is defined as the centroid of the first detection type being located inside the second detection type.

When computing the probability of cancer for a lesion in an input image, the lesion's particular values of evidence are used to obtain conditional probability values from FIGS. 13 and 14. The probabilities of not cancer and cancer (i=0, 1) after evidence is considered, $P(C_i|e_1, e_2, \ldots, e_n)$, is given by $$Pr(C_i | e_1, e_2, \ldots, e_n) = \frac{p(e_1 | C_i)p(e_2 | C_i) \ldots p(e_n | C_i)Pr(C_i)}{\sum_{j=0}^{1} p(e_1 | C_j)p(e_2 | C_j) \ldots p(e_n | C_j)Pr(C_j)} \quad (3)$$

where $p(e_k|C_i)$ is the conditional probability value of the $k^{th}$ element of evidence given the $i^{th}$ cancer category and is obtained from conditional distribution tables. The calculations will be demonstrated for the calc Bayes network. The mass and spiculation calculations are accomplished in the same fashion.

Example Computations for the Calc Bayes Network

The Calc Bayes Network, 5100, computes the probabilities of "not cancer" and "cancer" given Calc Evidence, 6100. These probabilities are computed as $$Pr(C_i | e_1, e_2) = \frac{p(e_1 | C_i)p(e_2 | C_i)Pr(C_i)}{\sum_{j=0}^{1} p(e_1 | C_j)p(e_2 | C_j)Pr(C_j)} \quad (4)$$

where $Pr(C_0)$ and $Pr(C_1)$ are probabilities of "not cancer" and "cancer", assumed here to both equal 0.5. Assume the evidence for a calc detection are as follows: the calc detection is not collocated with a mass or spiculation detection and the calc classifier produces a discriminant value of 1.75. Thus, the first evidence value is '0', and the conditional probabilities of "not cancer" and "cancer" are taken from Table 14(c) as $p(e_1=0|C_0)=0.0948$ and $p(e_1=0|C_1)=0.1662$. To obtain $p(e_2=1.75|C_0)$, use the means and variances for the calc discriminant in Table 13(a). Evaluating the Gaussian probability density function with mean of 1.4661 and variance of 0.2282 at 1.75 gives $$p(e_2 = 1.75 | C_0) = \frac{1}{\sqrt{2\pi(0.2282)}} \exp\left(\frac{-1}{2} \frac{(1.75 - 1.4661)^2}{0.2282}\right) = 0.6999$$

and $p(e_2=1.75|C_1)=0.5219.$

Using the values above, the conditional probabilities of "not cancer" and "cancer" given the particular evidence are computed according to Equation 4:

$Pr(C_0 | e_1 = 0, e_2 = 1.75) =$ $$\frac{0.0948 \cdot 0.6999 \cdot 0.5}{0.0948 \cdot 0.6999 \cdot 0.5 + 0.1662 \cdot 0.5219 \cdot 0.5} = 0.8844$$

$Pr(C_1 | e_1 = 0, e_2 = 1.75) =$ $$\frac{0.1662 \cdot 0.5219 \cdot 0.5}{0.0948 \cdot 0.6999 \cdot 0.5 + 0.1662 \cdot 0.5219 \cdot 0.5} = 0.1156$$

The calculations of both "not cancer" and "cancer" probabilities are shown here for completeness. However, only the probability of cancer is used in subsequent processing. Mass and spiculation probabilities are computed in the same fashion. The Bayes probabilities for each lesion from each channel are provided to the Case Based Ranking step, 7000.

Case Based Ranking

Figure 15:
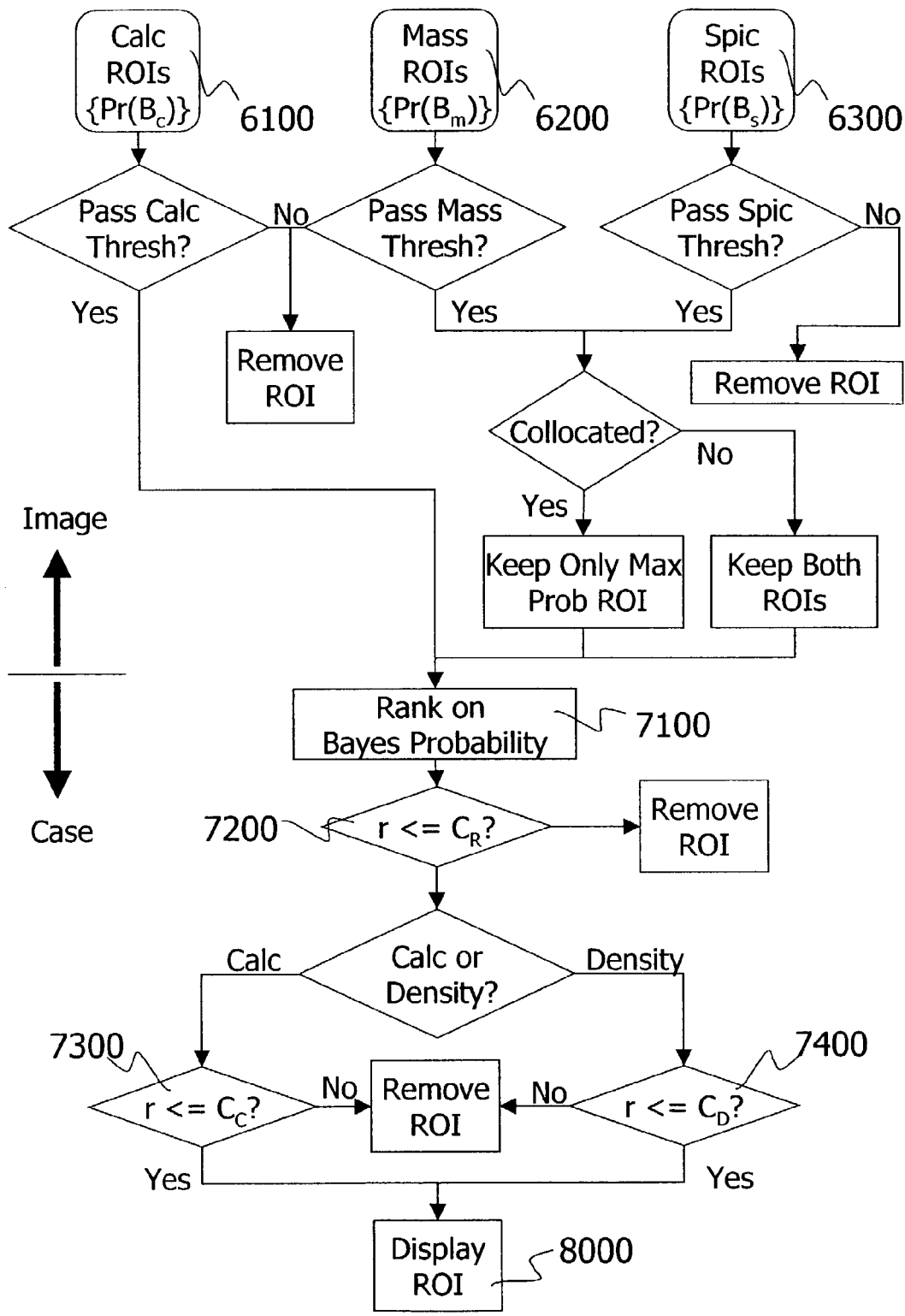
FIG. 15 is a flow chart for the Case Based Ranking method.

This section describes the context processing flow, ROI probability thresholding and case-based rank ordering. FIG. 15 shows an overall block diagram of the post-processing system. The processing is performed on each image of the case and surviving ROIs accumulate across the images in the case. Steps above the Image/Case line are performed on each image. These steps provide a set of case values for processing below the Image/Case line. The operation of the context and case processing section is now described.

Once the probability of cancer is calculated using the Bayesian network, the detections within an image are analyzed separately for each detection type. First, the probability of cancer for each ROI is compared to a predetermined channel-specific threshold. All ROIs with "cancer" probabilities less than the threshold are removed. ROIs with "cancer" probabilities greater than a threshold are retained for subsequent processing. In a preferred embodiment, the thresholds are as shown in Table 1.

TABLE 1

Bayes Thresholds.

| Channel | Threshold |
|---|---|
| Calc | 0.3 |
| Mass | 0.29 |
| Spic | 0.44 |

In the Mass and Spiculation channels, detections with probabilities greater than corresponding thresholds are retained. If the detections are collocated, the detection with the greater Bayes probability is retained. Otherwise, both are retained. Collocation is determined by computing the centroid of both ROIs. If the centroid of a first ROI is within the second ROI, collocation is declared. After this point, mass and spiculation ROIs are considered to be one type of detection, referred to as a "density" detection.

All remaining ROIs are then jointly ranked by Bayes probabilities, largest to smallest, across the case in step 7100. If more than a predetermined maximum number, $C_R$, of ROIs remain, only the first $C_R$ ranked ROIs are retained, step 7200. Additional restrictions are then applied to the number of calc and density ROIs in the case. Only the $C_C$ most probable calc detections are retained in step 7300. Similarly, only the $C_D$ most probable density ROIs are retained in step 7400. Recall, density ROIs are obtained from the combined list of mass and spiculation ROIs. The surviving ROIs are the final detections, and are displayed in step 8000.

In a preferred embodiment, the maximum rank values are as shown in Table 2. The values in Table 2 are based on four image cases. If the actual number of images in a case does not equal four, rank limits may be recomputed.

TABLE 2

Maximum rank values in four image cases.

| Case Rank Parameter | Case Rank Limit |
|---|---|
| Case | 10 |
| Calc | 10 |
| Mass | 5 |

In a preferred embodiment, when only one image is in the case, limit the total number of marks to two; the calc and mass case rank limits also equal two. When the case consists of 2, 3, or four images, the rank limits of Table 2 apply. When the case consists of more than four images, the rank limits are recomputed as:

$$C_R = \text{round}(10*Num\text{Images}/4)$$

$$C_C = \text{round}(10*Num\text{Images}/4)$$

$$C_M = \text{round}(5*Num\text{Images}/4)$$

where NumImages is the number of images in a case, and round( ) denotes rounding to the nearest integer.

The final marks that may appear on an output are those passing both the probability thresholding and the case rank ordering from the context images.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Accordingly, modifications are contemplated which can be made without departing from either the spirit or the scope of the present invention.

What is claimed is:

1. A method of detecting malignancy of a lesion, comprising the steps of:
   computing evidence from each lesion based on specific type of said lesion using multiple lesion-specific channels, wherein each channel comprises a lesion-type specific tuned detector, lesion-type specific feature and lesion-type specific classifier;
   providing said evidence to a lesion-type specific Bayes network; and
   computing a probability of malignancy for each lesion.

2. The method of claim 1 wherein said evidence comprises collocation to detected lesions, a ranking of each lesion relative to other lesions in an image, and a discriminant score associated with the lesion.

3. The method of claim 1 wherein each of said probabilities is compared to a threshold.

4. The method of claim 3 including performing a case-based-ranking, based on the probability value for each lesion, on all lesions passing the threshold, wherein a predetermined number of lesions having the highest probability value are retained.

5. The method of claim 1 wherein said lesions comprise specific lesion types, said step of computing evidence comprises computing lesion-type specific evidence, and said lesion-type specific evidence is provided to lesion-type specific Bayes networks for computing lesion-type specific probabilities.

6. The method of claim 5 wherein each of said probabilities is compared to a lesion-type specific threshold.

7. The method of claim 6 including determining whether two lesions of different lesion-types are collocated and, if collocated, selecting the lesion of the collocated lesions having the greater probability value.

8. The method of claim 7 wherein said two lesions of different lesion-types comprise a mass lesion and a spiculation lesion.

9. The method of claim 8 including performing a case-based-ranking, based on the probability value for each lesion, on all of the lesions passing the lesion-type specific thresholds, wherein a predetermined number of lesions having the highest probability value are retained.

10. The method of claim 9 including limiting the number of calcification lesions retained to a first predetermined number, limiting the combined number of mass lesions and spiculation lesions retained to a second predetermined number, and displaying the remaining retained lesions.

11. In a CAD system for detecting suspicious lesions, a method of selecting lesions for final display comprising the steps of:
    calculating a probability of malignancy for each lesion based on specific type of said lesion using multiple lesion-specific channels, wherein each channel comprises a lesion-type specific tuned detector, lesion-type specific feature, lesion-type specific classifier and lesion-type specific Bayes network; and
    using the probability of malignancy as a selection criteria affecting a final display of suspicious lesions.

12. The method of claim 11 wherein the probability of malignancy is computed based on evidence derived from each lesion and provided to a Bayes network.

13. The method of claim 12 wherein said evidence comprises collocation of detected lesions, a ranking of each lesion relative to other lesions in an image, and a discriminant score associated with the lesion.

14. The method of claim 11 wherein the lesions are rank-ordered by probability of malignancy, and a predetermined maximum number of lesions having the highest probability value, with reference to all lesions in a case, are retained.

15. The method of claim 14 wherein a subset of the predetermined maximum number of lesions of a specific lesion type, is retained.

16. The method of claim 11 wherein the lesions are rank-ordered by probability of malignancy, and a predetermined maximum number of lesions having the highest probability value, with reference to all lesions in an image, are retained.

17. The method of claim 16 wherein a subset of the predetermined maximum number of lesions of a specific lesion type, is retained.

18. A method of detecting malignancy of a lesion, comprising the steps of:
    using multiple independent lesion-type specific detectors to detect lesions, lesion-type specific features and lesion-type specific classifiers to detect lesions;
    computing lesion-type specific evidence corresponding to each detected lesion;
    providing said lesion-type specific evidence to lesion-type specific Bayes networks; and
    computing a lesion-type specific probability value relating to malignancy for at least some of said detected lesions.

19. The method of claim 18 wherein the step of computing a lesion-type specific probability value for at least some of said detected lesions comprises computing said probability value for each lesion of a particular lesion-type independently of lesion-type specific evidence associated with lesions of a different lesion-type.

20. The method of claim 18 wherein said lesion-type specific Bayes networks independently compute probability values for calcification, mass and spiculation lesions.

* * * * *